Sept. 9, 1930.   B. HALLE   1,775,311
WELDING APPARATUS
Filed June 30, 1928   2 Sheets-Sheet 2
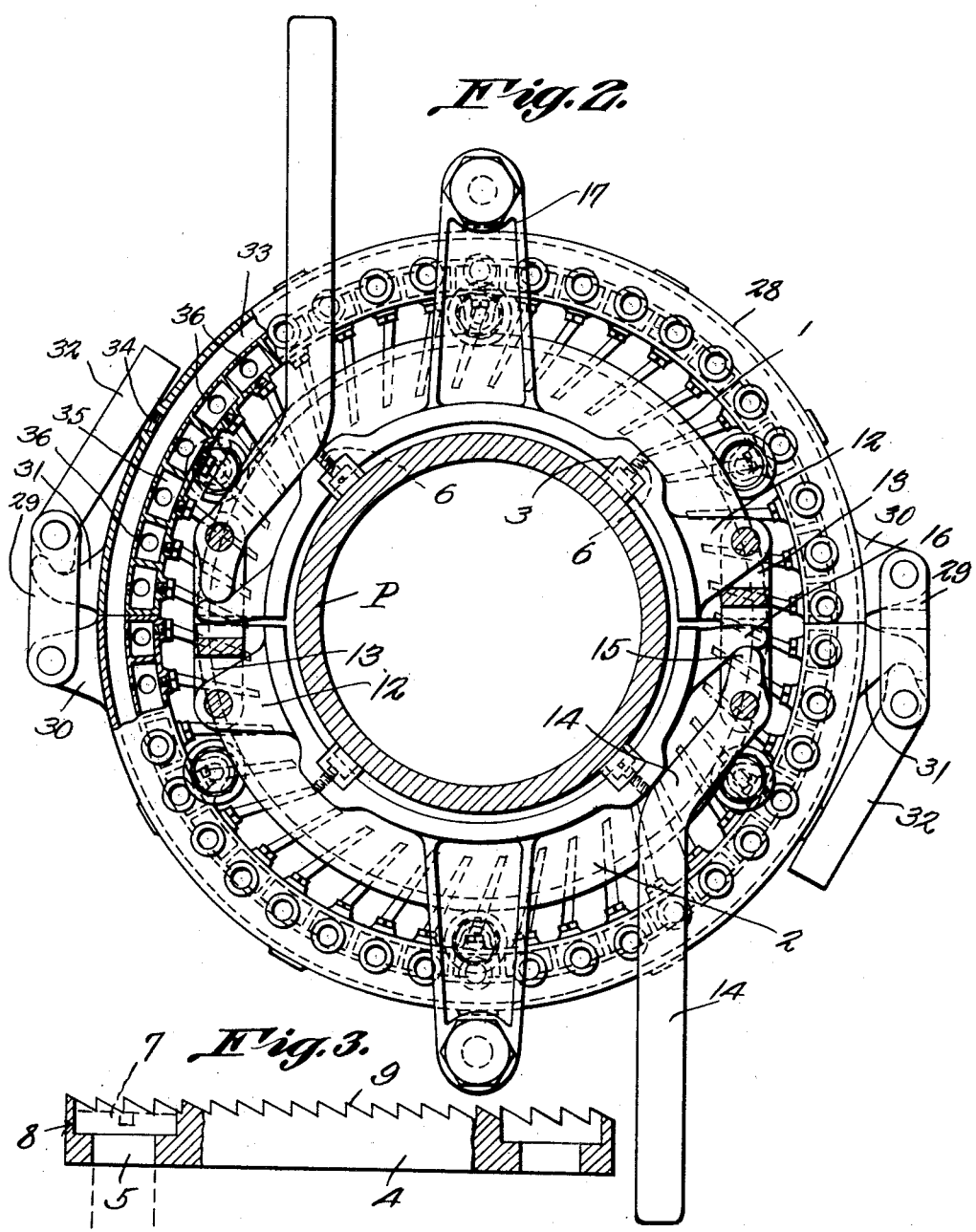
Bobbe Halle, Inventor Patented Sept. 9, 1930

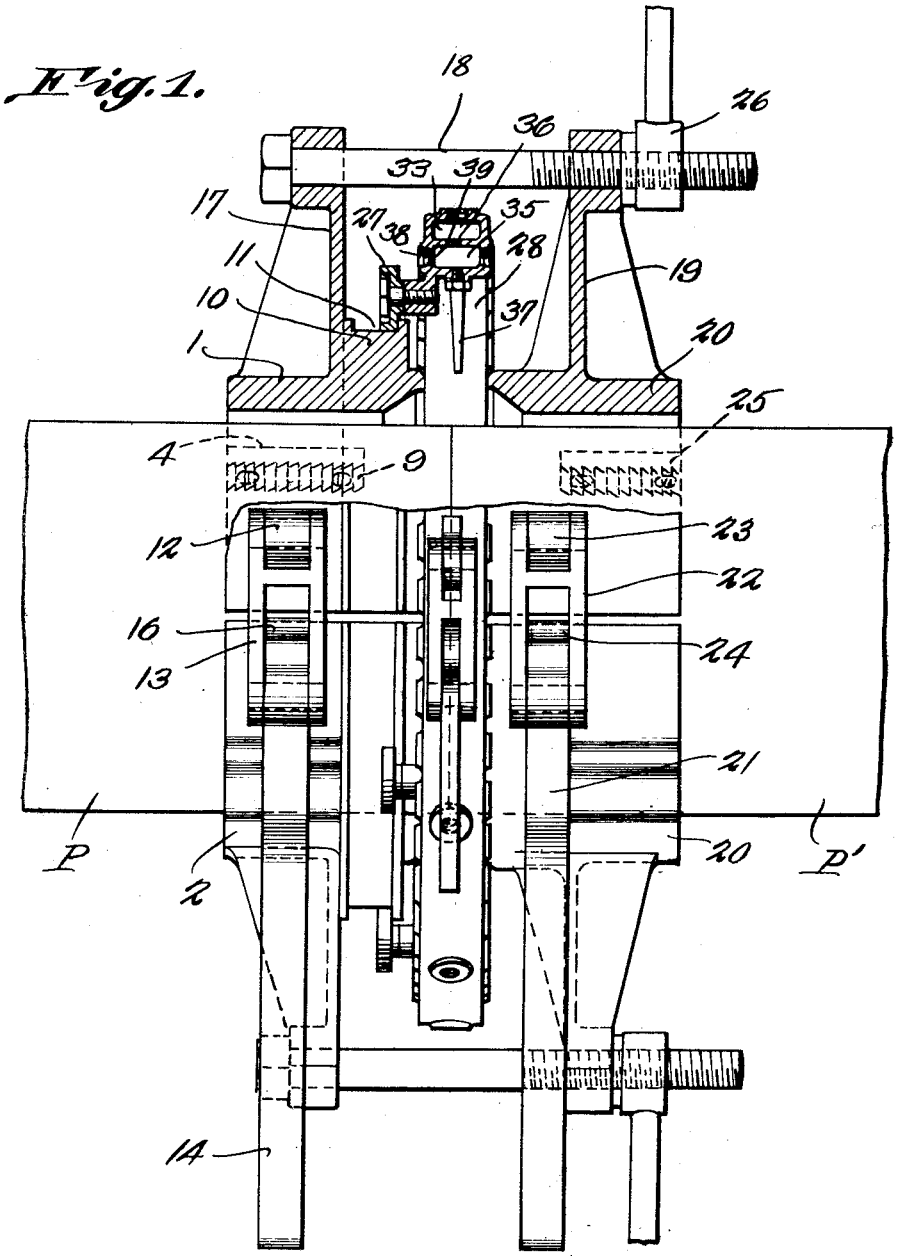

1,775,311

UNITED STATES PATENT OFFICE

BOBBE HALLE, OF GALVESTON, TEXAS, ASSIGNOR OF ONE-HALF TO FRED STOVALL, OF MONROE, LOUISIANA

WELDING APPARATUS

Application filed June 30, 1928. Serial No. 289,471.

This invention relates to apparatus designed primarily for use for welding pipes by the acetylene method, one of the objects being to provide a structure which can be applied readily to the pipes to be joined and have combined with it a rotary means for subjecting the meeting ends of the pipes to the action of an annular band of flame which will quickly bring the metal to a welding heat.

A further object is to provide a simple and efficient means for drawing the pipes together when the metal is brought to the amalgamating condition.

A further object is to provide simple and efficient means for distributing the fuel about the apparatus whereby an annular band of flame of uniform intensity is produced.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred form of the invention has been shown.

In said drawings,

Figure 1 is a view partly in elevation and partly in section of the apparatus applied to the meeting portions of two alined pipes to be welded.

Figure 2 is a side elevation of the apparatus, a portion being broken away and one of the pipes being shown in section.

Figure 3 is a view partly in elevation and partly in section of one of the gripping jaws.

Referring to the figures by characters of reference 1 and 2 designate opposed yokes cooperating to constitute one of the collars of the apparatus, each of these yokes being substantially semi-circular and being provided in its inner or concave face with grooves 3. A gripping jaw in the form of a strip 4 is seated in each groove 3 and has openings 5 in its end for the reception of screws 6 the heads 7 of which are adapted to be seated in counterbores 8 formed at one end of the openings 5. Teeth 9 are provided along one face of each strip 4 and when the strips are fastened to the yokes by means of the screws 6 as shown particularly in Figure 2, these teeth will engage the outer surface of the pipe P to which the yokes are applied.

Each of the yokes 1 and 2 has a hub section 10 projecting from one face thereof, these hub sections being designed, when the yokes are assembled about a pipe, to cooperate to provide an annular track 11 formed by a peripheral groove in the hub portions 10.

At one end of each yoke 1 and 2 there is provided an ear 12 straddled by one end of a link 13 which is pivotally connected to the ear. Pivotally mounted in the other end of this link is a lever 14 having a cam 15 projecting from the pivoted end thereof. This cam is adapted to engage a lug 16 extending from the adjacent end of the opposed yoke. The link 13 is adapted to swing to position astride this lug and when it is thus located lever 14 can be swung on its pivot so as to cause the cam 15 to ride on the lug 16 and force said lug toward the adjacent ear 12. As the two ends of the opposed yokes 1 and 2 are provided with these tightening and holding means it will be apparent that when the two levers are thus shifted to force the lugs 16 toward the ears 12, the toothed jaws 4 will be caused to bite into the adjacent portions of the pipe surface so that the collar formed of the two yokes will thus be held against movement relative to the pipe on which it is mounted.

Oppositely extending arms 17 are carried by the yokes 1 and 2 at points between the ends thereof and extend radially to points remote from the periphery of the collar. Each of these arms has a bolt 18 mounted therein. Said bolts are extended through arms 19 similar to the arms 17 which radiate from opposed arcuate portions or yokes 20 providing a collar for engagement with another pipe P' to be welded. The yokes 20 are adapted to be held together by clamping levers 21 and links 22 similar to those already described and cooperating with ears 23 and lugs 24 corresponding with ears 12 and lugs 16. These yokes also have jaws 25 constructed and mounted in the same manner as the jaws 4 and adapted, when the yokes 20 are tightened about the pipe P', to bite into the surface of said pipe so as to hold the collar formed by said yokes against movement relative to the pipe. Each of the bolts 18 is engaged by a takeup nut 26 which, when screwed along the bolt, will cause the arms 19 to be forced toward the arms 17, thereby bringing the ends of the alined pipes P and P' tightly together. The collars 20 differ from the collars 1 and 2 in that they are not provided with hub extensions providing a track as heretofore described.

Mounted to travel on the track 11 are rollers 27 journaled on one side of a ring 28 which, as shown particularly in Figure 2, is made up of opposed semicircular members abutting at their ends. These members are held together detachably by links 29 pivotally connected to ears 30 extending from the respective members of the ring. Each link is adapted to straddle a lug 31 extending from the adjacent end of the opposed member of the ring and a cam lever 32 is pivotally mounted within each link for engagement with the adjacent lug 31 whereby the two opposed members of the ring can be drawn together tightly and held as shown particularly in Figure 2.

Formed within each of the members of the ring 28 is a passage 33 extending from one end to the other thereof, the two passages communicating at their ends and cooperating to provide an annular distributing chamber. Openings 34 are formed in the periphery of the ring at any desired points and are employed for directing fuel from any suitable source to the distributing chamber formed by the passage 33.

Formed within each member of the ring 28 is a series of non-communicating cells 35, each series of cells being extended from one end to the other of the member of the ring. All of the cells communicate, through small apertures 36, with the distributing chamber 33 and extending from the inner periphery of the ring is an annular series of nozzles 37 all radially disposed relative to an imaginary circle concentric with the longitudinal axis of the pipes. Each nozzle opens into one of the cells 35 and the outlet ends of the nozzles project between the opposed collars of the apparatus to points where jets of flame issuing therefrom will be directed against the meeting ends of the pipes when the apparatus is properly positioned. Suitable openings 38 can be formed in opposed walls of the cells 35, these openings being provided to facilitate coring. Normally the openings are all closed by plugs 39.

In practice the two collars are placed in position on the respective pipes P and P' close to the ends thereof, the members of the ring are mounted between the collars with the rollers 27 in engagement with the track 11. The pipes are then placed in alinement with their ends together and the bolts 18 are inserted through the arms 19. Thereafter the nuts 26 are tightened so as to force the ends of the pipes together.

The gaseous fuel is directed into the distributing chamber 33 through a flexible hose or the like whereupon the gas will be distributed equally to all of the cells 35 and can be ignited at the outlet ends of the nozzles 37. Thus jets of flame will be directed against the meeting ends of the pipes and, if desired, the ring carrying the nozzles can be rotated back and forth. The jets will form a practically continuous band of flame about the meeting ends of the pipes and when said ends are heated to the amalgamating temperature the nuts 6 can be further tightened so as to subject the pipes to additional thrust at their ends against each other. As soon as the pipes have been properly welded the supply of fuel to the ring is cut off and the apparatus can then be quickly removed.

What is claimed is:

1. A portable pipe fusing apparatus adapted to be moved along and shifted about the pipe being treated, including a pair of elements each being separable and adapted to encircle substantially the entire circumference of a pipe, each element being adapted to be mounted on each of two adjacent pipe ends, jaws on each element for gripping a pipe at spaced points around the periphery thereof, means engaging the pair of elements to move said elements toward each other to draw the adjacent pipe ends together, and an annular heating means separable to encircle the pipe, having nozzles directed toward the pipe, the heating means being rotatably mounted on one of the pipe encircling elements.

2. A portable apparatus adapted to be moved along and shifted about the sections of a pipe line, including separate separable elements for embracing respectively each of two adjacent pipe ends and for gripping said ends at annularly spaced points, a separable heating element mounted for rotation on one of the pipe embracing elements, including means for directing heat against the adjacent pipe ends, and means connecting the pipe embracing elements for moving them toward each other to draw the heated pipe ends together to fuse them.

3. A portable apparatus adapted to be moved along and about the sections of a pipe line, including separate separable elements adapted to embrace the adjacent end portions of the respective pipes to be joined and to grip said pipes at annularly spaced points, separable means mounted on one of said elements and adapted to rotate relative thereto, for directing jets of flame against the adjacent end portions of the engaged pipes, and means for drawing said elements toward each other to draw the engaged pipes together and fuse them.

4. A portable apparatus adapted to be moved along and about the sections of a pipe line, including separable elements adapted to be placed about the adjacent ends of the respective pipes to be joined and to grip said pipes at annularly spaced points, a separable ring mounted for rotation on one of said elements, nozzles carried thereby for directing jets of flame against the adjacent ends of the pipes to be joined, and means for drawing said elements toward each other thereby to draw the engaged pipes toward each other to fuse them together at their adjacent ends.

5. A portable pipe-fusing apparatus movable along and shiftable about the pipes to be joined, said apparatus including separable elements adapted to embrace the respective pipes close to the adjoining ends and to grip them at annularly spaced points to provide ventilating spaces between said elements and the pipes, a heating element including inwardly extended nozzles for directing jets of flame against the adjacent ends of the engaged pipes, said elements being rotatable relative to the pipe-engaging element and separable to embrace the pipes, and means for drawing the pipe engaging elements toward each other to draw the heated pipe ends together for fusing.

In testimony that I claim the foregoing as my own, I have hereto affixed my signature.

BOBBE HALLE.